United States Patent [19]

Cotton et al.

[11] Patent Number: 4,827,996
[45] Date of Patent: May 9, 1989

[54] POWER TOOL FOR TRIMMING LAMINATE

[75] Inventors: Lawrence M. Cotton; John C. Derler; Gary R. Compton, all of New Bern, N.C.

[73] Assignee: Robert Bosch Power Tool Corporation, New Bern, N.C.

[21] Appl. No.: 96,967

[22] Filed: Sep. 11, 1987

[51] Int. Cl.[4] .............................................. B23C 1/20
[52] U.S. Cl. ............................ 144/134 D; 144/136 C; 409/182
[58] Field of Search .......... 144/134 R, 134 D, 136 R, 144/136 C; 409/182, 181

[56] References Cited

U.S. PATENT DOCUMENTS

| | | | |
|---|---|---|---|
| 3,494,394 | 2/1970 | Stock | 144/134 D |
| 3,494,395 | 2/1970 | Graham | 144/134 D |
| 4,591,305 | 5/1986 | Bergler | 144/134 D |
| 4,655,653 | 4/1987 | Hall et al. | 409/182 |

Primary Examiner—W. Donald Bray
Attorney, Agent, or Firm—Michael J. Striker

[57] ABSTRACT

A power tool for trimming laminate having a motor, a motor housing, interchangeable bases, and a clamping ring. The motor housing has a lower portion having a smaller diameter than that of the rest of the housing. The clamping ring extends from and over the base and clamps around the lower portion of the motor housing. The interchangeable bases are formed as a trim router, laminate trimmer, offset trimmer, and tilt base trimmer, all of which clamp onto the lower portion of the motor housing so that the same motor can be used with any of the bases. The motor housing is also rotatable relative to the base into any one of a plurality of relative angular positions without affecting depth of cut of a bit.

40 Claims, 10 Drawing Sheets

F I G. 1
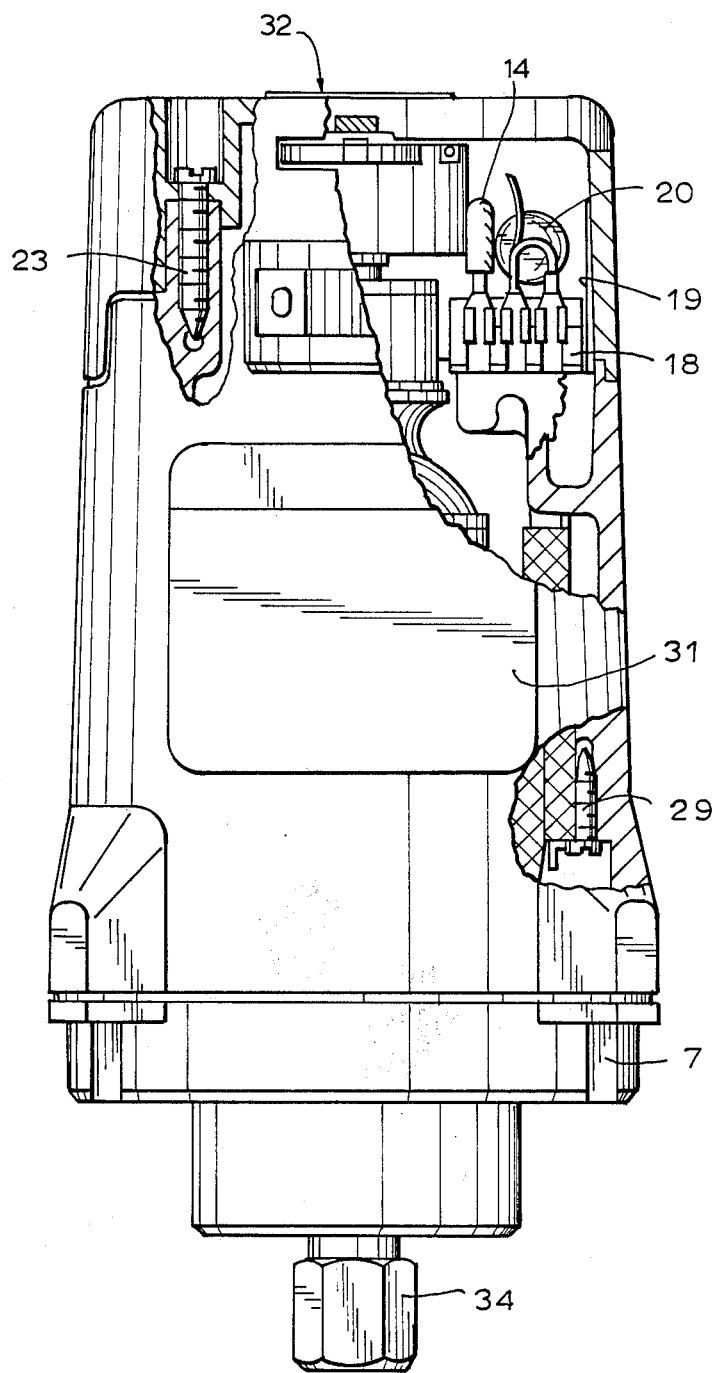

F I G. 4
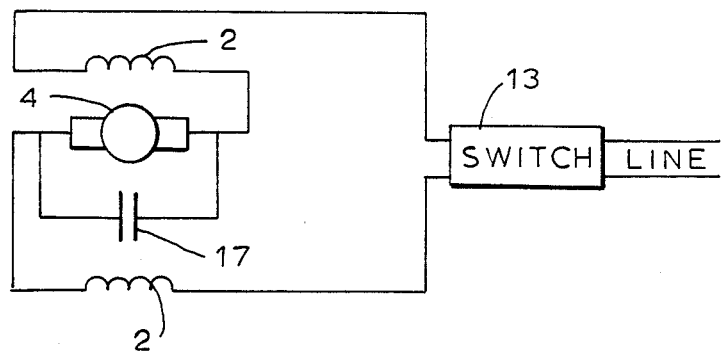
F I G. 5
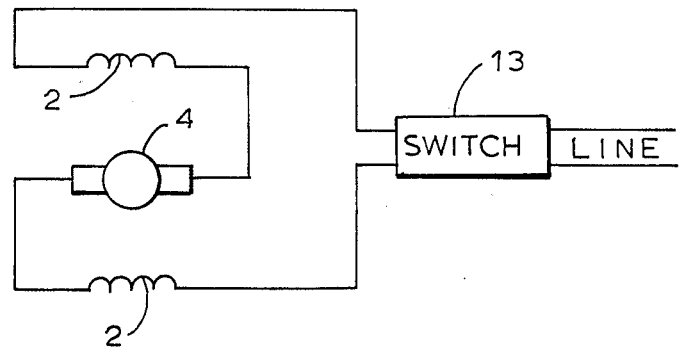
F I G. 7
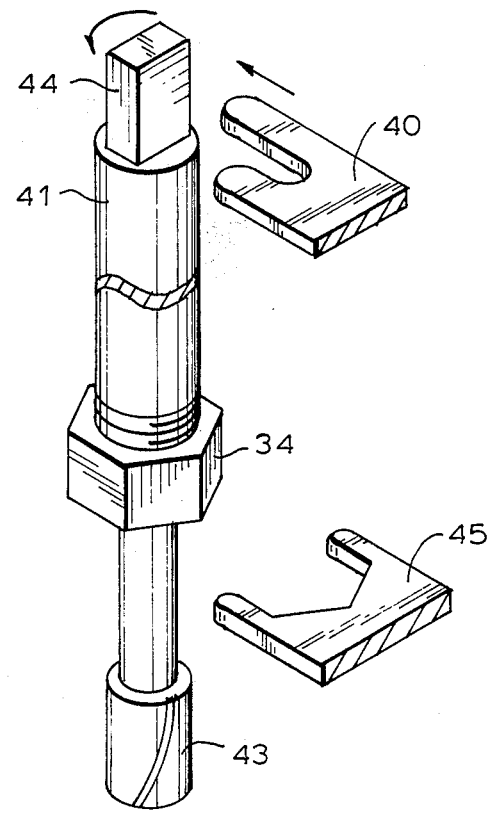

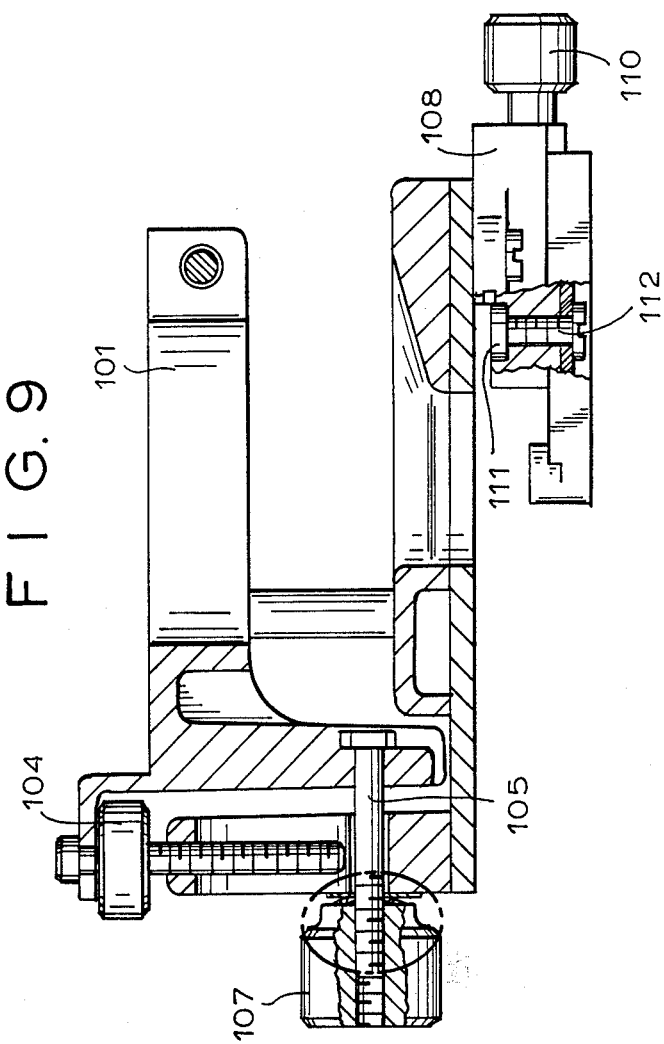
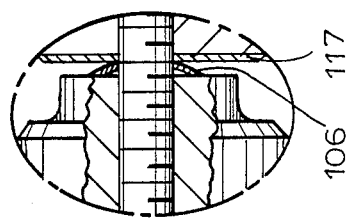
FIG. 9
FIG. 10

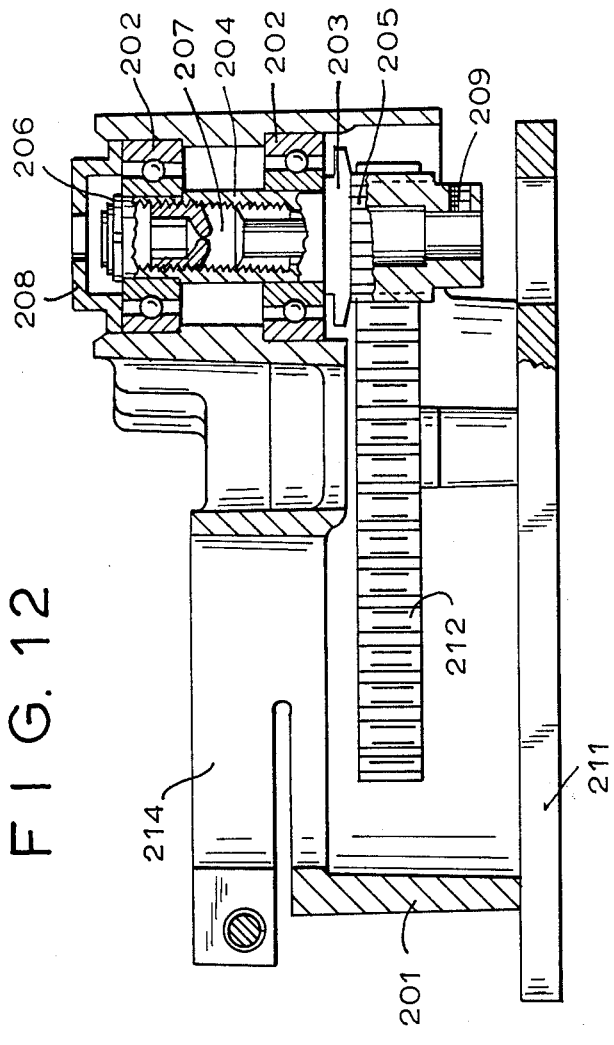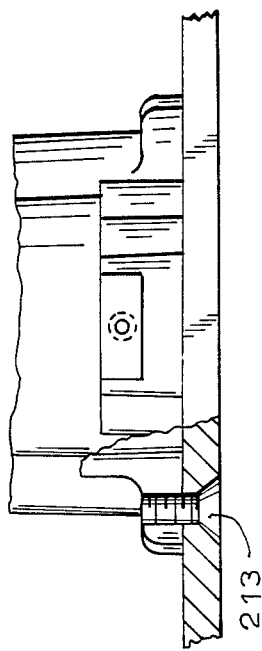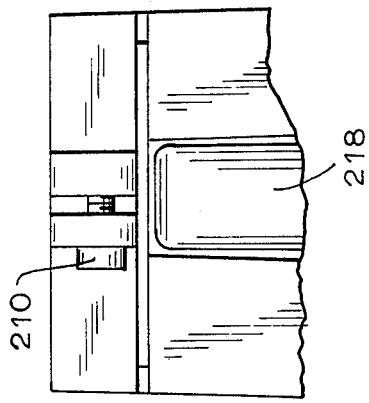

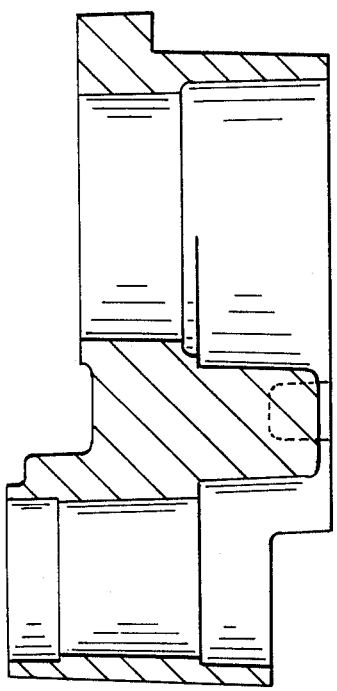
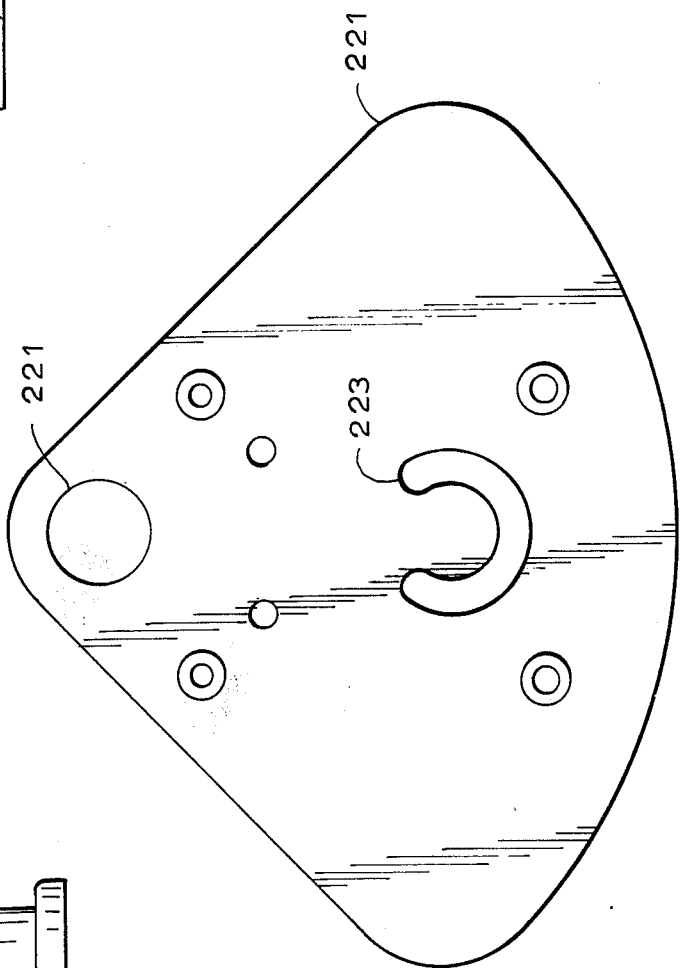
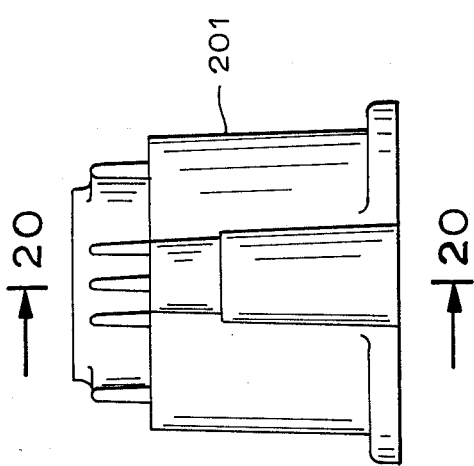

POWER TOOL FOR TRIMMING LAMINATE

BACKGROUND OF THE INVENTION

The present invention relates generally to a hand-held power tool for trimming laminate.

Laminate trimmers, trim routers, tilted base laminate trimmers and offset trimmers are known for guiding a bit rotatably driven by a motor through a base relative to a surface to be trimmed or cut. The bit is known sometimes to have a self-guiding tip such as a ball bearing bit in order to guide the bit along a workpiece surface under the surface to be trimmed or cut.

However, the manner in which the base is fastened to the motor housing differs from unit to unit, so that the bases are not interchangeable with each other. Often, the base extends along the length of the motor housing, making it difficult to grasp the unit. The motor housing often fits into the base in only one relative position, so that a user is unable to alter this relative position into a more convenient grasping arrangement.

Offset trimmers, which rotate a bit offset from the drive shaft of the motor, are known to have a clamping ring which fastens its base to an end of its motor housing. Its base is fastened to a subbase. A typical offset trimmer is known from U.S. Pat. No. 3,454,061. In order to drivably connect a drive belt with the drive shaft and bit, the subbase is temporarily removed to gain access.

It is known to provide a motor housing with a flat top so that the motor housing does not topple over when the flat top is placed on a surface.

SUMMARY OF THE INVENTION

It is the object of the present invention to provide a laminate trimmer system that is an improvement over the prior art.

In keeping with this object, and others which will become apparent hereafter, one aspect of the invention resides, briefly stated, in a power tool comprising an elongated motor housing having a top portion and a bottom portion, said bottom portion having a bottom end that is diametrically smaller than said top portion; a motor in said motor housing; an elongated drive shaft rotatably drivable by said motor, said drive shaft extending axially through said bottom end; means for variably directing the bit relative to the surface to be cut and including a plurality of interchangeable base attachments alternatively mountable to said bottom end of said housing, each of said base attachments having a base and adjusting means for variably orientating the bit relative to the surface, said adjustment means being mounted to said base, each of said bases being formed to accomodate passage of the bit therethrough; and means for interchangeably mounting said base attachments to said motor housing and including a plurality of clamping rings, each of said clamping rings having an axis extending over a respective one of said bases and having an identically formed inner surface which is interchangeably clampable around said bottom end of said motor housing.

It is an object of the present invention to provide bases that are interchangeable with each other onto a motor housing by means of a clamping arrangement common to all the bases. Before clamping, the motor housing is independently rotatable relative to the base into a plurality of relative angular positions without affecting the depth adjustment of the bit.

It is also an object to provide an area on the motor housing free of bit depth cut adjustment or other mechanisms that would otherwise be in the way of a user grasping the motor housing. The bit depth cut adjustment or other mechanisms are movably mounted between the subbase and the clamping ring.

It is a further object to provide a wrench locking system that locks a motor armature shaft into postion so as to enable the changing of bits.

An additional object is to provide an offset trimmer with a tapered and slotted drive pulley and access opening in a subbase to facilitate positioning a belt onto the drive pulley without the necessity for disassembling the subbase, the tapered drive pulley having a tendency to pull the belt onto the drive pulley when turned. Ribs are provided on the offset bracket of the offset trimmer above the belt so as to cool down ball bearings in the offset bracket while the belt is moving.

Another object is to provide a laminate trimmer guide holder with horizontal fine tune adjustment to suit any bit diameter. The guide holder is removably fixed to the subbase of the trim router or offset trimmer.

Yet another object is to fasten the guide holder to the subbase of the trim router, thereby forming a laminate trimmer, so that means for adjusting the guide holder extends beyond one side of the trim router base and means for adjusting the cutting depth of the bit extends from either the same one side or the oposite side of the base.

It is still another object to provide the guide holder with two members each having an open half-threaded portion so that when a screw is turned between the two open half-threaded portions, one members moves relative to the other in one plane.

Another additional object is to provide a tilt base assembly with a rack and pinion adjustment to vary the depth of the bit cut.

A further additional object is to provide the tilt base assembly with a cradle pivotally connected to the base in which the cradle has two perpendicular sides, forming a corner edge therebetween. The tilt base is formed so that no portion of the tilt base projects beyond this corner edge of the cradle at any relative angular position of the cradle relative to the rest of the tilt base assembly.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a partially broken side elevational view of a motor assembly in accordance with the present invention.

FIG. 4 is a schematic wiring diagram of the motor with a condenser.

FIG. 5 is a schematic wiring diagram of the motor without a condenser.

FIG. 7 is a perspective view depicting a bit changing system of the present invention.

FIG. 9 is a cross-sectional view taken across section line 9—9 of FIG. 8.

FIG. 10 is an enlargement of a portion of FIG. 9.

FIG. 12 is a side elevational view of an offset trimmer base attachment, partially in cross-section, in accordance with the present invention.

FIG. 13 is a partial upper rear elevational view of the offset base attachment.

FIG. 14 is a partially broken lower front elevational view of the offset trimmer base attachment.

FIG. 19 is a side view taken from the left of FIG. 17.

FIG. 20 is a cross-section taken across section lines 20—20 of FIG. 19.

FIG. 21 is a bottom view of the subbase of the offset trimmer base attachment.

DETAILED DESCRIPTION OF THE PREFERRED EMBODIMENT

Figure 2:
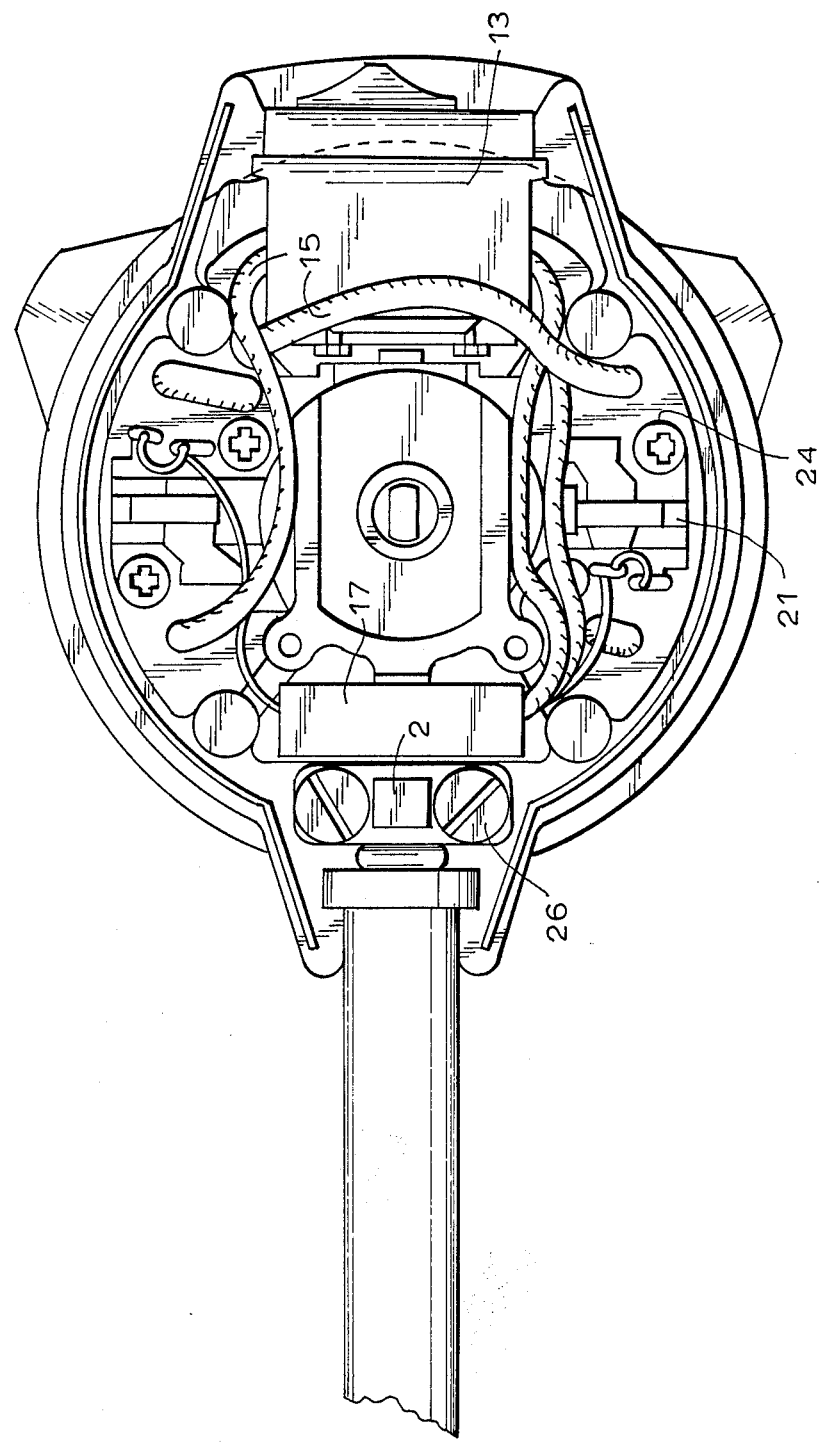
FIG. 2 is an open top view of the motor assembly without a cap.
Figure 3:
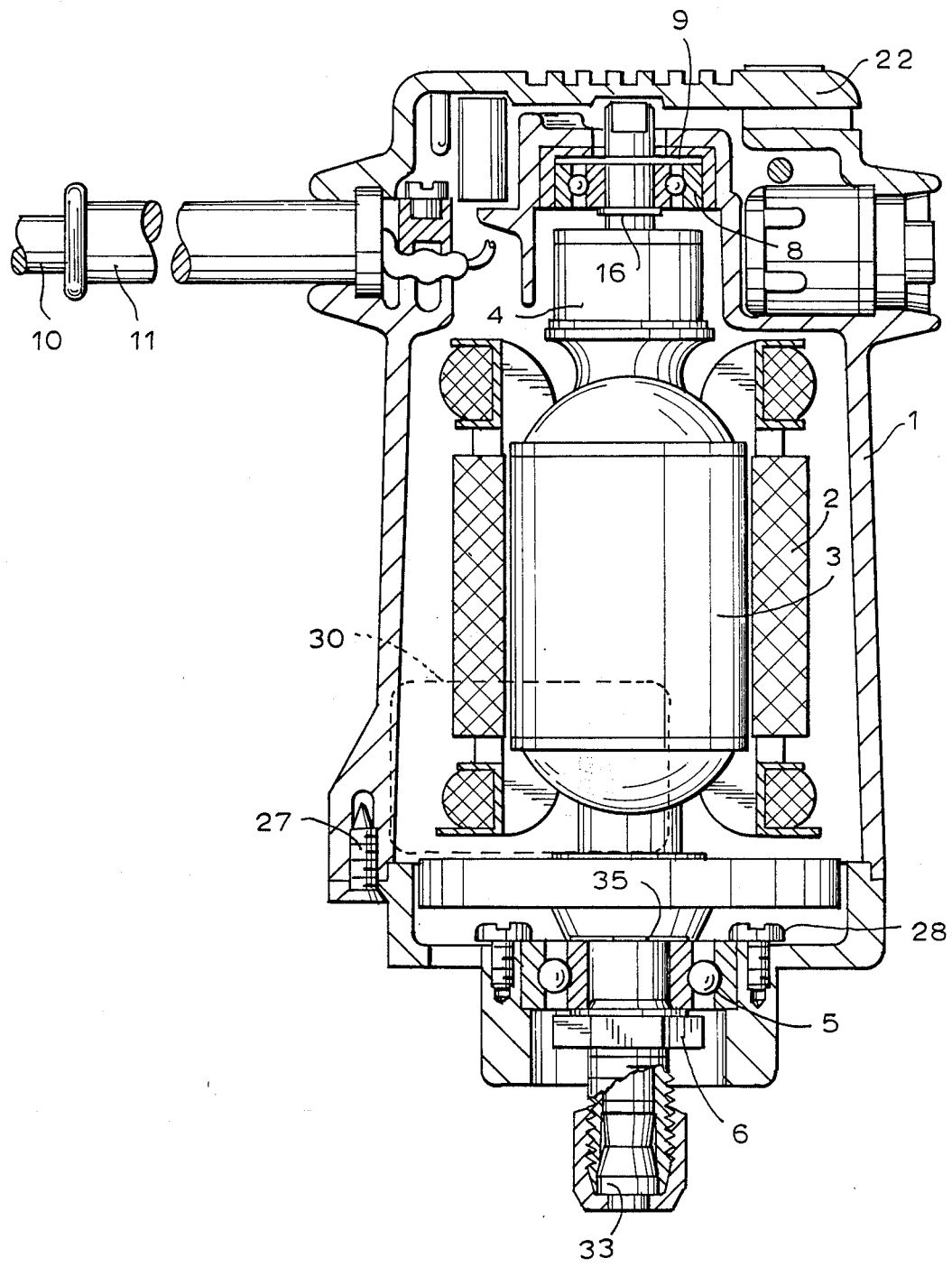
FIG. 3 is a cross-section of the motor assembly taken across the vertical axis of FIG. 1.

Referring now to the drawings, FIGS. 1-3 depict a motor assembly having a motor housing 1. An armature 3 extends along a longitudinal axis in a top portion of the motor housing 1. A field coil 2 extends adjacent to the armature parallel to the longitudinal axis of the motor housing 1. The motor housing 1 also has a bearing housing 7 having a bottom end smaller in diameter than the top portion. The top of the motor housing is fitted with a flat housing cover 22 and screwed thereto by means of four screws 23. When the flat surface of housing cover 22 is then placed on a surface, the motor will not topple over.

A drive shaft extends from the armature 3 through the bearing housing 7 and out an opening at the bottom end of the bearing housing 7. A ball bearing 5 is arranged in the bearing housing 7 between the shaft and the inner surface of the bearing housing 7 to rotatably connect the drive shaft to the inside surface of the bearing housing 7. A lock nut 6 is secured to the end of the shaft beneath a ball bearing 5 to keep armature 3 from moving up.

Figure 6:
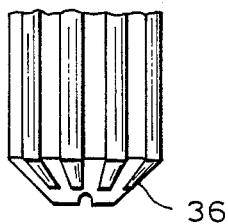
FIG. 6 is a front view of a tapered drive pulley in accordance with the invention.

A collet nut 34 is fitted on a collet 33 to accommodate router bitrs. Alternatively, a tapered drive pulley 36, as in in FIG. 6, is screwed onto the end of the shaft beneath the lock nut 6 instead of the collet 33/collet nut 34 for use with a later-mentioned offset base specialty attachment.

A retaining ring 35 is arranged above the ball bearing 5 to keep armature 3 from moving downward. Screws 28 abut ball bearing 5 to keep the ball bearing 35 from moving toward the armature 3. The bearing housing 7 is screwed to the motor housing 1 by means of three screws 27.

A retaining ring 16, a ball bearing 8 and a spring washer 9 are arranged around an armature shaft above a commutator 4 of armature 3 to permit rotatable movement of the armature shaft relative to the upper portion of motor housing 1. Retaining ring 16 abuts the inner track of the ball bearing 8 to keep ball bearing 8 from moving downward into the armature 3.

A power cord with plug 10 is electrically connected to power a circuit for powering the motor. This circuit is arranged in series and includes an on-off switch 13, lead wires 14 and 15, carbon brushed 21 in brush holders 18, and the field coil 2. This motor circuit is shown schematically with and without a condenser 17, as shown in FIGS. 4 and 5. Condenser 17 suppresses electrical sparking noise and reduces radio interference.

An insulator 19 insulates the motor housing cover 22 from brush holder 1 for safety reasons. Two spiral springs 20 bias carbon brushes 21 into electrical contact with the commutator 4. A strain relief 11 surrounds a portion of the power cord 10 immediately leaving the motor housing 1 to relieve tension. Screws 26 secure a cord clamp 12 to the motor housing 1, the cord clamp 12 clamping the cord 10 in position in the motor housing 1. Two screws 29 secure field coil 2 into position.

In order to change bits as shown in FIG. 7, one side of a wrench 40 is inserted through a slot in the motor housing cover 22 to automaticallly turn and lock the armature shaft 41. The armature shaft 41 has a portion with flats 44, which is a portion having a rectangular cross-section. The one side of the wrench 40 has two prongs, one prong being longer than the other. Thus, the longer prong will push against an end of the flats causing rotation of the shaft until the flats are fitted between the two prongs, thereby locking the shaft against any further rotation. Once locked, the collet nut 34 is loosened by means of a second wrench 45. The bit 43 is inserted into the collet 33 and the collet nut 34 tightened with the second wrench 45.

The remaining figures show specialty attachment bases suited for particular applications, each of which is interchangeable with the other on the bearing housing 7.

The base specialty attachments have common characteristics. Each has a base fastened to a subbase by means of thread cutting screws passing through aligned holes in the subbase and threaded into the base. The heads of the four thread cutting screws are accomodated in recesses surrounding the holes in the subbase.

All base specialty attachments are interchangeable with each other and used with the same motor assembly.

Each base specialty attachment has a clamping ring portion which is elevated above the base and is radially split to form two inside circumferential faces. The clamping ring has an extension that extends radially outward from either side of the split, one extension having a threaded hole into which is threaded a clamping screw. Thus, the two inside circumferentical faces can be brought closer together or further apart by turning the clamping screw accordingly.

The bearing housing 7 is inserted into this clamping ring and then rotated relative to the clamping ring into any relative angular position, so that power cord 10 and strain relief 11 can be moved to suit the user's preference and on-off switch 13 can be conveniently oriented relative to the user's fingers to enable one hand of the user to completely control the operation of the motor and simultaneously position the motor housing relative to a workpiece as desired. The clamping ring screw is screwed in further so as to tighten the clamping ring onto the bearing housing 7.

Each base specialty attachment also has an opening passing through its subbase and the portion of its base directly above, through which a bit is to be extended. This opening is circular in the trim router/laminate trimmer and offset bases amd U-shaped in the tilt base assembly. The opening is directly underneath the clamping ring for the trim router/laminate trimmer base and tilt base assembly and offset from the area directly underneath the clamping ring in the offset base.

Each base specialty attachment has adjustment means, located below the motor housing, for adjusting the depth of a bit cut. In the offset base, this adjustment means is in the form of a bit adjustment 207, which located the bit in rlation to the shaft, and set screw 209, which is screwed in to fix the position of a bit through the bit opening. In the other specialty attachments, adjustment means is effected by varying the distance between the clamping ring and the base.

Figure 8:
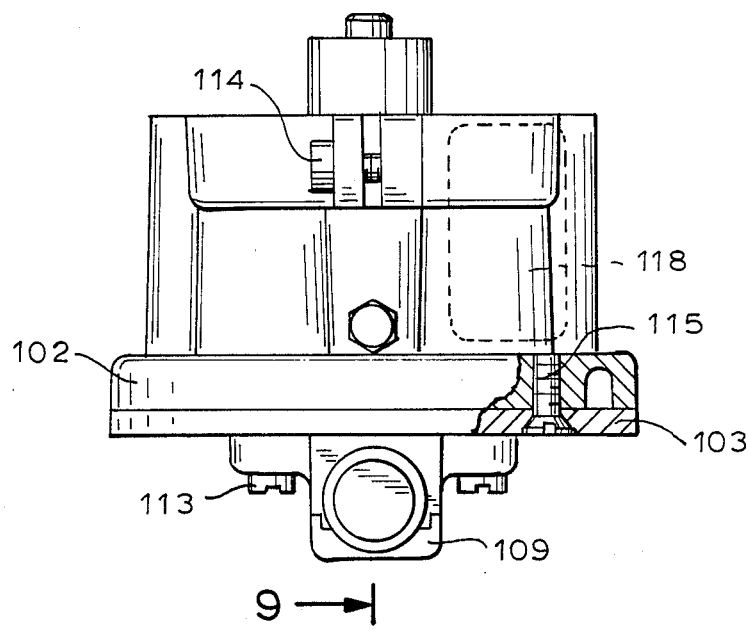
FIG. 8 is a partially broken front elevational view of a router/trimmer base attachment, in accordance with the present invention.
Figure 11:
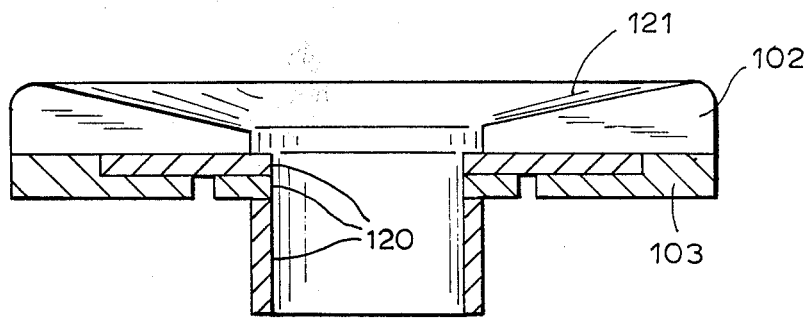
FIG. 11 is a cross-section of a template installed in the embodiment of FIG. 8-10.
Figure 16:
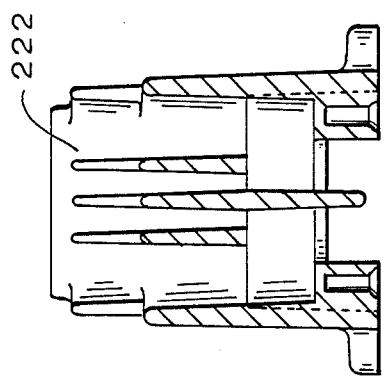
FIG. 16 is a cross-section taken across section lines 16—16 of FIG. 15.
Figure 18:
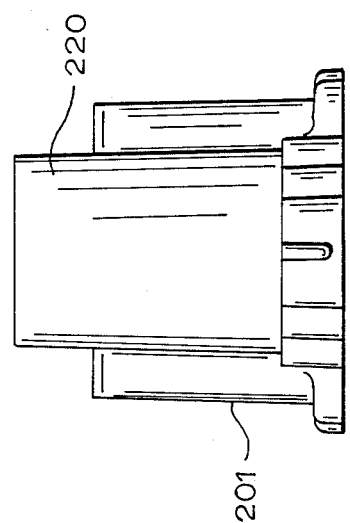
FIG. 18 is a side view taken from the right of FIG. 17.
Figure 15:
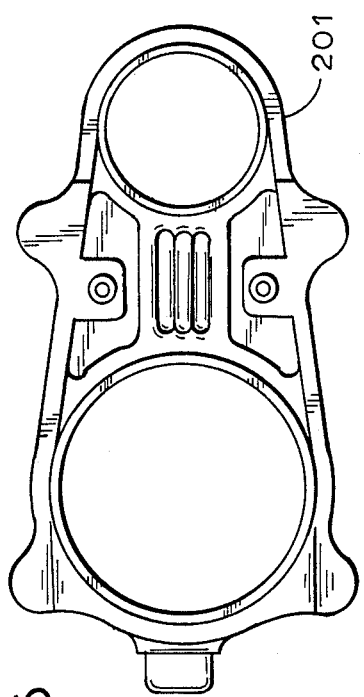
FIG. 15 is a bottom view of the offset bracket of the offset trimmer base attachment.
Figure 17:
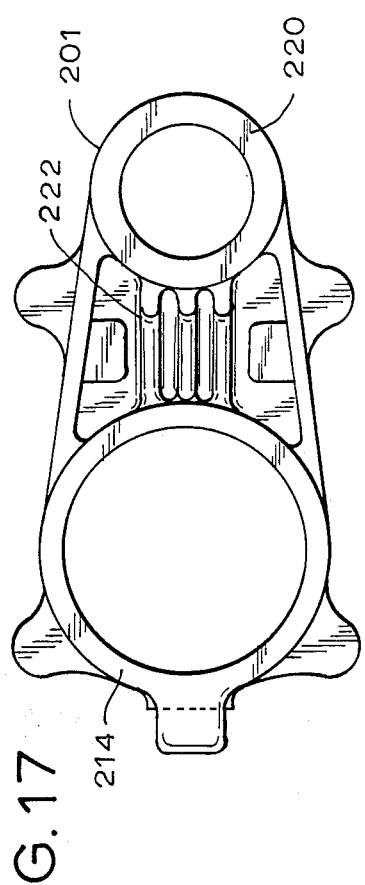
FIG. 17 is a top view of the offset bracket of the offset trimmer base attachment.

FIGS. 8–10 show a router base which becomes a laminate trimmer base by fixing guide holder 108 thereto. The router base is used with piloted, unpiloted, or ball-bearing bits used in cutting grooves, edging, and template routing such as inlay work. The laminate trimmer base with guide holder 108 is used with bits that do not have piloted guides. The guide holder 108 is adjustable to suit the bit diameter and guides the bit when in contact with the edge of a workpiece under the laminate to be trimmed.

Base 102 has a rectangular plate and a vertical portion extending perpendicularly upward from one side of the rectangular plate. A rectangular subbase 103 is fixed to the rectangular plate of base 102 at the four corner areas by screws 109.

The vertical portion of base 102 has a top section which contains a threaded opening extending vertically downward. Vertical adjusting screw 104 threads into this threaded opening.

A slot extends vertically through this vertical portion between this top section and the rectangular portion of base 102. A screw 105 extends through this slot. A knob 107 is threaded onto a portion of the hex head screw projecting outward from the slot. A spring washer 106 and flat washer 117 are arranged between the knob and the vertical portion of the base 102 and are wider than the width of the slot.

Vertical adjusting screw 104 has a head at one end and a disc-like portion spaced from this head. The disc-like portion is knurled to facilitate turning vertical adjusting screw 104. Clamping ring 101 has an extension positioned into abutment between the head and disc-like portion of vertical adjusting screw 104. This extension has a groove which accomodates the portion of the shaft of the vertical adjusting screw 104 between the head and disc-like portion. Clamping ring 101 also has a lower vertical portion which has a hole through which the screw 105 passes.

The distance between clamping ring 101 and the rectangular plate of base 102 can be varied by turning the vertical adjusting screw 104 in cooperation with a loosening of the knob 107. Subsequent tightening of the knob 107 will fix the distance between the clamping ring 101 and base 102 and thereby vary the depth of cut by the bit when the bearing housing 7 is clamped by clamping ring 101 in any relative angular position spanning 360°.

A template guide 120 may be installed in a recess in subbase 103 so as to be sandwiched between subbase 103 and base 102. Template guide 120 has a passage through its center to accomodate a bit therethrough. When installed, a portion of the template guide 120 extends through the bit opening through subbase 103 and base 102 and can be pressed against a contour edge of a template in order to guide the bit relative thereto. The rectangular plate of base 102 also has a concave depression 121 around the circular opening through which passes the bit to improve visibility of the cut.

The router base converts into the trimmer base by fixing a guide holder 108 to the underside of subbase 103.

Guide holder 108 has an upper elongated member and lower elongated member. The lower elongated member has an elongated slot and an open half-threaded end. The upper elongated member has a hole and an open half-threaded end. A screw 112 passes through the elongated slot in the lower elongated member and passes through the hole in the upper elongated member and is threaded into a nut 111. Nut 111 fits into an accomodating rectangular groove surrounding the hole in the upper elongated member. The head of screw 112 is similarly accomodated in a groove surrounding the elongated slot in the lower elongated member.

Elongated guide grooves and projections slidably engage each other on the upper and lower elongated members so that the lower elongated member is only movable back and forth along the elongated slot with respect to the upper elongated member.

An adjusting screw 110 extends longitudinally between the open half-threaded end portion in each of the upper and lower elongated members. By turning the adjusting screw 110 between the half-thread end portions, the lower elongated member moves finely relative to the upper elongated member.

The upper elongated member of guide holder 108 has two lateral openings. Subbase 103 and the rectangular portion of base 102 each have two pairs of concentrically aligned holes opposite each other relative to the bit opening through which passes the bit 43. Two screws 113 pass through the two lateral openings and through a pair of the holes in subbase 103 and then thread into the aligned pair of holes in the rectangular portion of base 102. The head of the screws 113 press the area around the lateral openings of the upper elongated member against the subbase 103. It is therefore possible to fasten guide holder 108 to subbase 103 in one of the two pairs of holes so that adjusting screw 110 extends outward from the side of subbase 103 that is either on the same side or on the opposite side of subbase 103 from which extends knurled knob 107.

In FIGS. 12–14, an offset base specialty attachment is illustrated, which is used for trimming backsplashes, scribing to walls, and trimming inside corners of backsplashes. An offset bracket base 201 is mounted on a subbase 21 by four screws 213. Subbase 211 is formed to have the shape of a quarter circle per FIG. 21, but with rounded corners. Offset bracket base 201 is centered on subbase 211, symmetric about an imaginary radial center line dividing subbase 211 into two halves. Screws 213 fasten offset bracket base 201 to subbase 211.

Clamping ring 214 is elevated above subbase 211 and extends from offset bracket base 201 as a half ring. The clamping ring 214 is longitudinally split to form two inside circumferential faces, the spacing between these faces being adjustable by turning a screw 210.

Offset bracket base 201 has a cylindrical portion 220 extending vertically upward from and concentrically aligned with a circular opening 221 in subbase 211 through which will extend the bit. This cylindrical portion 220 is spaced away from and above subbase 211. A spindle 204 extends axially through the cylindrical portion 220 and is freely rotatable relative to the cylindrical portion 220 by means of ball bearings 202 between the spindle 204 and the cylindrical portion 220.

A toothed belt 212 is meshed with a toothed driven pulley 205 on spindle 204 and extends over to a space directly below the center of the clamping ring 214 and above subbase 211. Thereby, a turning of the toothed belt 212 will effect a turning of spindle 204. A flange 203 is arranged on spindle 204 above the toothed drive pulley 205 so as to separate ball bearings 202 from the toothed drive pulley 205 and to keep the belt from moving upward. Tapered drive pulley 36 (FIG. 6) has a plurality of grooves radially spaced apart from each other about the exterior surface thereof so as to be compatible with the toothed inside of the toothed belt 212.

A set screw 209 is located in the side of spindle 204 below the toothed drive pulley 205. A retaining ring 206 is arranged at the upper end of the spindle 204 above the ball bearings 202, the retaining ring 206 having a convex side facing upward. A dust cap 208 with an opening is placed on top of the cylindrical portion 220 for sealing the same.

In order to fix a bit, the shank of the bit is inserted into the hole in the end of spindle 204 until it stops on bit stop screw 207. A hex key is inserted through the opening of the dust cap 208 and into the upper end of the bit stop screw 207. The hex key is turned clock-wise to raise and counter-clockwise to lower the bit (for a left-hand thread) until the desired depth of cut is achieved. Set screw 209 is then tightened in the side of spindle 204 with another hex key to lock the bit in position.

Guide holder 108 may also be fastened to the bottom of subbase 211 of the offset trimmer base specialty attachment in the same manner as to subbase 103 of the trimmer/router base specialty attachment.

Figure 6A:
FIG. 6A is a side view of the pulley shown in FIG. 6.

Offset bracket base 201 also has a finned portion 222 extending between the cylindrical portion 220 and the clamping ring 214 consisting of three fins. The finned portion 222 extends at a level above toothed belt 212 so as to form a space between subbase 21 and this finned portion 222. These fins cool ball bearings 202 during belt rotation by as much as 5° F. than would otherwise be the case if the area were completely devoid of fins. Tapered pulley 36 has a slot in one end for screwing onto the lower end of the armature shaft. See FIG. 6A.

A C-shaped access opening 223 is provided in subbase 211 nearly concentric with the clamping ring 214. Thus, a screwdriver may be inserted through this access opening 223 to place toothed belt 212 onto the tapered drive pulley 36. The fact that the end of the tapered drive pulley is tapered toward this access opening 223 when the motor housing 1 (or bearing housing 7) is held by clamping ring 214 facilitates the placement of toothed belt 212 theron, without the need for disassembling subbase 211. This taper also serves to help further guide toothed belt 212 onto the drive pulley during rotation of toothed belt 212.

Figure 22:
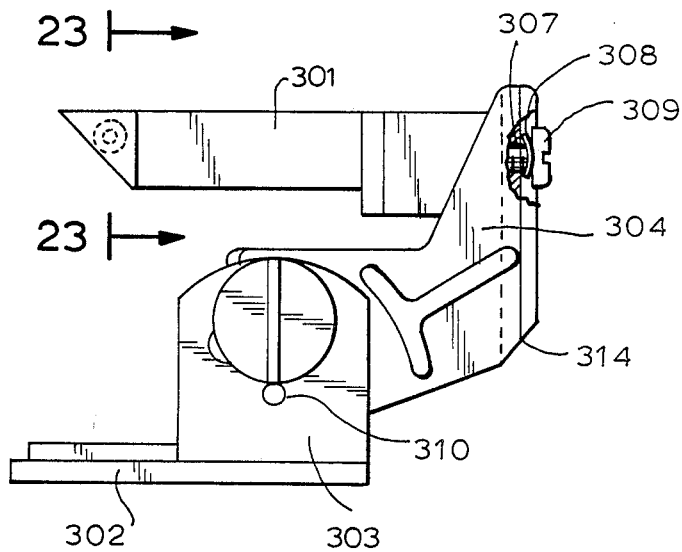
FIG. 22 is a side elevational view of a tilt base attachment in accordance with the present invention.
Figure 23:
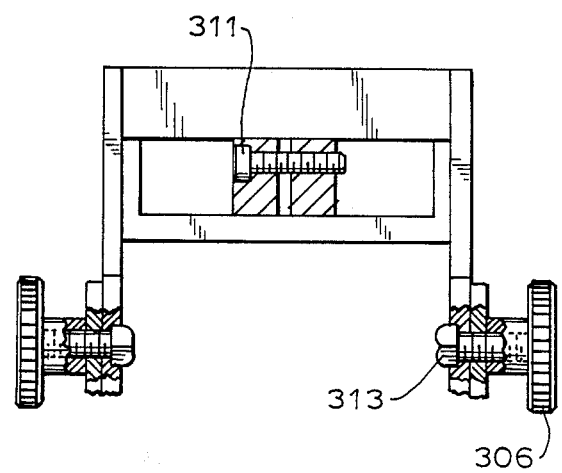
FIG. 23 is a partially broken front elevation view as viewed across section lines 23—23 of FIG. 22.
Figure 24:
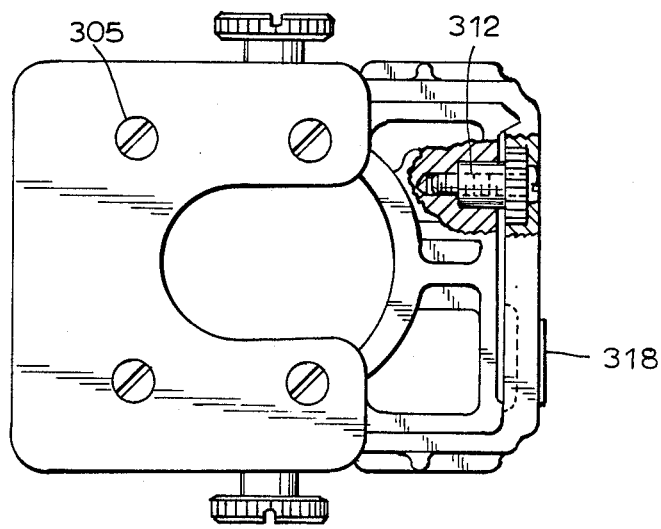
FIG. 24 is a partially broken top view of the tilt base attachment.

FIGS. 22-24 depict a tilt base assembly, which is used for tilting up to 45° in one direction and 30° in the other direction for odd angle cuts and trimming to corners, thereby affording a 75° angular sweep. Subbase 302 is fastened to base 303 by means of screws 305. Base 303 has two opposite sides with an upright portion extending upward therefrom. A U-shaped opening extends through both subbase 302 and base 303.

A cradle 304 is pivotally connected to the two vertical portions by means of two pins 310. An arc opening extends circumferentially above one of the pins 310 through the upright portion of base 303, wherein the groove pin 310 constitutes the radial center for the arc opening. The arc opening sweps from an angle of 30° in one direction to 45° in the other direction relative to the subbase 302. Each angle degree of the arc is marked off on the upright portion of base 303.

A screw 303 is inserted through the arc opening and passes through an aligned opening circular opening in cradle 304. A threaded knob 306 is threaded onto an end of hex head screw 313. Cradle 304 can be set into any desired angular orientation relative to base 303 within the 75° sweep of the arc opening by loosening threaded knob 306, positioning the cradle 303 relative to the base 303, and tightening threaded knob 306 so that screw 313 and wingnut 306 cooperate with each other to press cradle 306 into position against the upright portion of base 303. A second screw with a second threaded knob is inserted through aligned holes passing through the opposite side of the cradle 304 and opposite vertical portion of base 303 to strengthen the fixing of the relative position of the cradle 304 to base 303 when either an angular end or 0° position of the arc sweep is choosen. Two aligned holes are made in the upright portion of base 303 to correspond with one end position of the arc sweep and the central (0°) position of the arc sweep.

When the central position of the arc sweep is selected, cradle 304 has a lower portion extending substantially parallel to the subbase 302 and has an upper portion extending upward perpendicular to the lower portion. A clamping ring bracket 301 extends perpendicular to the upper portion.

Clamping ring bracket 301 is movable up and down along the upper portion of cradle 340. This upper portion has two parallel slots extending side by side and substantially perpendicular relative to the lower portion of cradle 304. One slot is toothed and grooved and formed to mesh with a gear 312 extending into cradle 304. This constitutes a rack and pinion arrangement. The second slot is grooved a accomodates a depth locking screw 309 therethrough, which threads into clamping bracket 301. Thus, neither the gear 312 nor depth locking screw 309 substantially projects beyond the outward face of cradle 304. In this manner, the depth adjustment mechanism will not become an obstacle to positioning the cradle 304 and subbase 302 flush against respective workpiece surfaces.

Depth locking screw 309 is used to lock in the position clamping ring bracket 301 relative to cradle 304 and is used to unlock the same. By turning gear 312 in the toothed slot when the depth locking screw 309 unlocks the relative position of cradle 304 and clamping ring bracket 301, clamping ring bracket 301 will move toward or away from the lower portion of cradle 304 along the upper portion of cradle 304 and remain perpendicular to the upper portion, thereby varying the distance between the subbase 302 and clamping ring bracket 301. Depth locking screw 309 is then used to lock in this relative position. A spring washer 308 and flat shim 307 are arranged on depth locking screw 309 between the head of depth locking screw 309 and the grooved portion of the second slot, to keep pressure between the clamping ring bracket and the cradle.

Clamping ring bracket 301 is split longitudinally to form two inside circumferential faces. The space between these two inside circumferential faces is adjustable by means of turning a cheese head screw 311 threaded into one threaded opening in one of the two respective extensions on either side of the split.

The tilt base assembly is constructed to prevent any portion from protruding into the surface of a planar workpiece. This construction involves limiting the angular sweep of the tilting of the cradle 304 relative to subbase 302 and by angling a corner edge 314 between the upper and lower portions of cradle 304 away from base 303 so that a plane passing across this corner edge 314 is not intersected by any portion of the tilt base assembly in any tilt position within this limited angular sweep. Thus, this corner edge 314, which faces outward, and subbase 302 can be placed flush against respective workpiece surfaces to enable accurate trimming without any other portion of the tilt base assembly marring either surface.

Further, the laminate trimmer/router of the present invention can be easily used for other applications such as polishing, grinding, etc. by simply replacing the bit with an applicable tool implement such as a polishing brush, grinding wheel, etc.

It will be understood that each of the elements described above, or two or more together, may also find a useful application in other types of power tools differing from the types described above.

While the invention has been illustrated and described as embodied in a power tool for trimming laminate, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for the various applications without omitting features that, from the standpoint of prior art, fairly constitute essential characteristics of the generic or specific aspects of this invention.

What is claimed is new and desired to be protected by Letters Patent is set forth in the appended claims:

1. A power tool for trimming a surface, comprising:
   an elongated motor housing having a top portion and a bottom portion, said bottom portion having a bottom end that is diametrically smaller than said top portion;
   a motor in said motor housing;
   an elongated drive shaft rotatably drivable by said motor, said drive shaft extending axially through said bottom end;
   a plurality of interchangeable base attachment alternatively mountable to said bottom end of said housing, each of said base attachments having a base and adjusting means for variably adjusting the bit relative to the surface, each of said bases being formed to accomodate passage of the bit therethrough; and
   means for interchangeably mounting said base attachments to said motor housing and including a plurality of clamping rings, each of said clamping rings having an axis extending over a respective one of said bases and having an identically formed inner surface which is interchangeably clampable around said bottom end of said motor housing, said adjusting means being formed so that the bit is variably adjustable relative to the surface by said adjusting means when a respective one of said clamping rings clamps said bottom end, said bases including at least two of a router base, tilt trimmer base, and an offset trimmer base.

2. A power tool as defined in claim 1; further comprising:
   means for trimming a non-horizontal surface and including means for fixably tilting one of said bases relative to a respective one of said clamping rings.

3. A power tool as defined in claim 2, wherein said fixably tilting means includes a cradle having a lower portion, an upright portion, and a corner portion angled between said lower portion and said upright portion so as to have an outward facing angled surface, said lower portion having an end pivotally connected to said one base, said clamping ring being movable relative to said upright portion and extending perpendicular thereto, said fixably tilting means being formed to limit tilting of said cradle relative to said one base to within a predetermined relative angular sweep so that a plane passing across said angled surface does not intersect any of said one base and said fixably tilting means.

4. A power tool as defined in claim 3, wherein said fixably tilting means is formed to limit said relative angular sweep to 75°.

5. A power tool as defined in claim 4, wherein said fixably tilting means is formed to limit said relative angular sweep between 30° in one direction relative to an axis perpendicular to said one base and 45° in a direction opposite said one direction relative to said axis perpendicular to said one base.

6. A power tool as defined in claim 1, wherein said adjusting means includes a rack and pinion between said one base and said respective clamping ring.

7. A power tool as defined in claim 1, wherein said top portion of said motor housing has a lower edge adjacent to said lower portion, said motor housing being formed so as to be fixable by a respective one of said clamping rings into one of a plurality of angular positions in a plane perpendicular to said drive axis so that said top portion of said motor housing is accessible without interference from a respective one of said bases associated with said respective clamping ring.

8. A power tool as defined in claim 1; further comprising:
   means for guiding along a workpiece and including a guide holder detachably mountable to at least one of said bases.

9. A power tool as defined in claim 8, wherein said guide holder has two members movable relative to each other back and forth and means releasably fixing said two members together to prevent said two members from moving in any direction other than back and forth; and
   means for moving one of said two members relative to the other of said two members and including an open half-threaded portion in each of said two members facing each other and an adjusting screw between said open half-threaded portion of each of said two members so that a turning of said adjusting screw moves one of said two members relative to the other of said members.

10. A power tool as defined in claim 1, wherein said motor housing has a flat surface on top of said top portion, said motor housing and said motor being formed so that said flat surface being placeable on a horizontal flat surface without said motor and motor housing toppling over even when any of said bases is mounted thereon.

11. A power tool as defined in claim 1; further comprising:
   means for changing a bit on said drive shaft and including a wrench engaging said drive shaft to turn and lock the same, said motor housing having an access opening to said drive shaft, said wrench extending through said access opening.

12. A power tool as defined in claim 11, wherein said wrench has an end with tro prongs, said drive shaft having a flat portion having a rectangular cross-section and faces, one of said two prongs being longer than the other of said two prongs, said wrench engaging said drive shaft when said one of said two prongs is pushed against said flat portion causing said drive shaft to turn so that one of said faces is turned into contact against said one of said two prongs and so that when said wrench is further pushed so that the other of said two prongs contacts an opposite one of said faces, said wrench thereby holding said flat portion firmly between said two prongs to prevent any further rotation of said drive shaft.

13. A power tool as defined in claim 1, wherein said plurality of bases includes a trim router base, a laminate trimmer base, a tilted trimmer base, and an offset trimmer base, each of said bases being interchangeable with each other on said bottom end of said housing.

14. A power tool as defined in claim 13, wherein said laminate trimmer base is formed as a trim router base with a guide holder detachably secured to said trim router base, said guide holder also being detachably securable to said offset trimmer base.

15. A power tool as defined in claim 1, wherein one of said base attachments includes a subbase attached to said base and means for trimming offset relative to said axis of a respective one of said clamping rings, said trimming offset means including a spindle spaced away from said drive shaft and rotatably mounted to said base, a first drive pulley on said spindle and a second drive pulley, means for facilitating placement of said belt on said first drive pulley and including an access opening through said subbase.

16. A power tool as defined in claim 14, wherein said means for facilitating placement further includes a tapered end formed on said first drive pulley, said tapered end extending toward said access opening in said base when said bottom end of said motor housing is mounted in said clamping ring.

17. A power tool as defined in claim 15, wherein said base includes an offset bracket, said offset bracket having a cylindrical portion with an inside surface; further comprising:
   means for rotatably connecting said spindle to said inside surface of said cylindrical portion and including ball bearings; and
   means for cooling said ball bearings and including a finned portion extending between said cylindrical portion to said clamping ring so as to pass over said means for transferring rotation, said means for transferring rotation being formed to cause air to flow through said finned portion while transferring rotation.

18. An attachment for a power tool with a bit for trimming a surface, the power tool including a motor housing with a top portion and a bottom portion with a bottom end, the attachment comprising:
   a base attachment having a base, said base being formed to accomodate passage fo the bit therethrough;
   means for mounting said base attachment to the bottom end of the motor housing and including a clamping ring extending over said base and having an axis and being formed to clamp around the bottom end of the motor housing; and
   adjusting means for fixably moving said base relative to said clamping ring so as to vary the depth of cut of the surface to be trimmed by the bit when the bottom end of the motor housing is mounted in said clamping ring, said adjusting means being arranged between said base and said clamping ring and including releasably locking means for releasably locking said base into position relative to said clamping ring, said releasably locking means including a member extending between said base and said clamping ring.

19. An attachment as defined in claim 18, wherein said base has a circular opening for accomodating the bit passing therethrough, aid opening being concentric to and directly underneath said clamping ring.

20. An attachment as defined in claim 19, wherein said adjusting means includes a rack and pinion between said clamping ring and said base.

21. An attachment as defined in claim 18; further comprising:
   a cradle having an end pivotally connected to said base, said cradle having a upper portion holding said clamping ring perpendicular thereto; and
   means for fixably tilting said cradle relative to said base, each of said cradle and said base being formed to accomodate the bit of the power tool passing therethrough.

22. An attachment as defined in claim 21, wherein said clamping ring is fixably movable back and forth relative to said cradle so as to cause a distance between said clamping ring and said base to vary.

23. An attachment as defined in claim 22, further comprising:
   means for moving said clamping ring back and forth and including a rack and pinion, said rack being formed in said upper portion of said cradle, said pinion meshing with said rack and being rotatably fixed to said clamping ring.

24. An attachment as defined in claim 21, wherein said cradle has a lower portion with said end pivotally connected to said base, an upright portion, and a corner portion angled between said lower portion and said upright portion so as to have an outward facing angled surface, said clamping ring being movable relative to said upright portion and extending perpendicular thereto, said fixably tilting means being formed to limit tilting of said cradle relative to said base to within a predetermined relative angular sweep so that a plane passing across said angled surface does not intersect any of said base and said fixably tilting means.

25. An attachment as defined in claim 21, wherein said fixably tilting means is formed to limit said relative angular sweep to by a predetermined amount.

26. An attachment as defined in claim 21, wherein said fixably tilting means is formed to tilt said cradle relative to said base so that said cradle is passable through a plane perpendicular to said base.

27. An attachment as defined in claim 18, further comprising:
   a subbase fixed to said base and being composed of plastic material, said said base being composed of metallic material.

28. An attachment as defined in claim 18; further comprising:
   means for guiding along a workpiece and including a guide holder, said base being formed with at least two portions spaced apart from each other, each of said two portions being formed so that said guide holder is detachably mountable thereto, said guide holder being detachably mounted to said base on one of said two portions.

29. An attachment as defined in claim 28, wherein said guide holder has two members movable relative to each other back and forth and means for releasably fixing said two members together to prevent said two members from moving in any direction other than said back and forth.

30. An attachment as defined in claim 19; further comprising:
   means for moving one of said two members relative to the other and including an open half-threaded portion in each of said two members facing each other and an adjusting screw between said open half-threaded portion of each of said two members so that a turning of said adjusting screw moves one of said two members relative to the other of said members.

31. An attachment for a power tool with a bit for trimming a surface, the power tool including a motor housing with a top portion and a bottom portion with a bottom end, the attachment comprising:
   a base attachment having a base, said base being formed to accomodate passage of the bit therethrough;
   means for mounting said base attachment to the bottom end of the motor housing and including a clamping ring extending over said base and having an axis and being formed to clamp around the bottom end of the motor housing;
   means for offset trimming, said base being formed with an upright portion and a cylindrical portion, said cylindrical portion having an inside surface, said offset trimming means including a spindle rotatably connected to said inside surface of said cylindrical portion, said offset trimming means also including a drive pulley on said spindle, said offset trimming means also including a toothed belt meshing with said drive pulley so that said spindle turns in association with said toothed belt; and
   a subbase fixed to said base, said subbase having an opening for accomodating the bit passing therethrough, said opening being arranged offset and away from an area of said subbase directly underneath said clamping ring, said offset trimming means further including means for accessing said toothed belt through said subbase and including an opening in said subbase in said area directly underneath said clamping ring.

32. An attachment as defined in claim 31, wherein said opening in said subbase directly underneath said clamping ring is formed C-shaped.

33. An attachment as defined in claim 31, wherein said subbase is formed to have a quarter-circular shape.

34. An attachment as defined in claim 31. wherein said trimming offset means further includes a tapered drive pulley wrapped by said toothed belt and tapering in a direction toward said subbase so that said spindle rotates in cooperation with a rotation of said tapered drive pulley, said tapering of said tapered drive pulley being formed to facilitate placement of said toothed belt onto said tapered drive pulley.

35. An attachment as defined in claim 31; further comprising:
   means for rotatably connecting said spindle to said inside surface of said cylindrical portion and including ball bearings therebetween, said base being formed with means for cooling said ball bearings and including a finned portion extending between said cylindrical portion and said clamping ring spaced away from said subbase above said toothed belt.

36. An attachment as defined in claim 31, further comprising:
   means for adjustably fixing a bit to said spindle and including a set screw screwable in said cylindrical portion of said base.

37. An attachment as defined in claim 31; further comprising:
   means for guiding along a workpiece and including a guide holder detachably mounted to said base.

38. An attachment as defined in claim 37, wherein said guide holder has two members movable relative to each other back and forth and means for releasably fixing said two members together to prevent said two members from moving in any direction other than said back and forth.

39. An attachment as defined in claim 38; further comprising:
   means for moving one of said two members relative to the other and including an open half-threaded portion in each of said two members facing each other and an adjusting screw between said open half-threaded portion of each of said two members so that a turning of said adjusting screw moves one of said two members relative to the other of said members.

40. A power tool as defined in claim 8, wherein said adjusting means extends outward relative to one side of said at least one base, said at least one base also having an opposite side that is opposite said one side, said guide holder including two members and means for adjustably moving said two members relative to and across each other, said guide holder being mounted to one of said one side and said opposite side of said at least one base.

* * * * *